Figure 1:
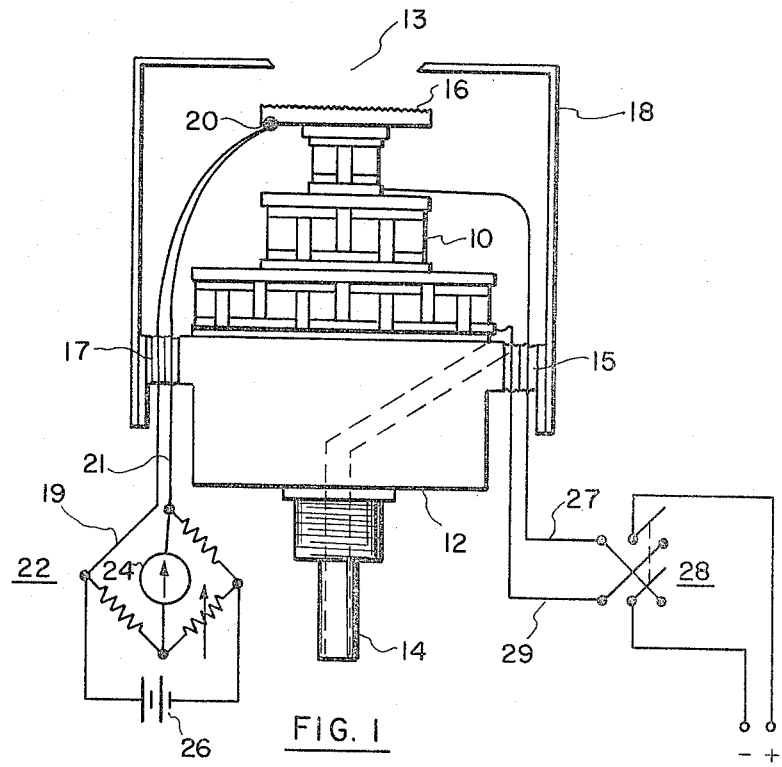

March 21, 1967

H. P. BEERMAN 3,309,881

BLACK BODY RADIATION SOURCE

Filed April 14, 1964

2 Sheets-Sheet 1

INVENTOR.
HENRY P. BEERMAN

BY Joseph Levinson

ATTORNEY

March 21, 1967  H. P. BEERMAN  3,309,881
BLACK BODY RADIATION SOURCE
Filed April 14, 1964  2 Sheets-Sheet 2

INVENTOR.
HENRY P. BEERMAN
BY Joseph Levinson
ATTORNEY ly the relation between temperature and radiation, a practical black body reference source is necessary to simulate the desired characteristics. Black body simulators are usually electrically heated insulated cavities with small apertures. Generally speaking, it is desirable for the black body radiation source to simulate radiation through a wide range of temperatures. One of the disadvantages with known black body radiation sources is that since they are electrically heated, they are unable to provide a reference source at temperatures lower than the ambient temperatures in which they are operated. To simulate such a condition it would be required to cool the unit, which the heating element cannot do. The use of both heating and cooling units adds to the cost and complexity of the source and tends to limit its portability.

United States Patent Office 3,309,881
Patented Mar. 21, 1967

3,309,881
BLACK BODY RADIATION SOURCE
Henry P. Beerman, Stamford, Conn., assignor to Barnes Engineering Company, Stamford, Conn., a corporation of Delaware
Filed Apr. 14, 1964, Ser. No. 359,622
4 Claims. (Cl. 62—3)

This invention relates to a black body radiation source.

A black body radiation source is a standard utilized in infrared work. The black body is an ideal emitter from which total radiation energy and the spectral distribution thereof are known. In order to measure practically the relation between temperature and radiation, a practical black body reference source is necessary to simulate the desired characteristics. Black body simulators are usually electrically heated insulated cavities with small apertures. Generally speaking, it is desirable for the black body radiation source to simulate radiation through a wide range of temperatures. One of the disadvantages with known black body radiation sources is that since they are electrically heated, they are unable to provide a reference source at temperatures lower than the ambient temperatures in which they are operated. To simulate such a condition it would be required to cool the unit, which the heating element cannot do. The use of both heating and cooling units adds to the cost and complexity of the source and tends to limit its portability.

Accordingly, it is an object of this invention to provide a novel black body radiation source which may be either heated or cooled by the same unit which is controlling the temperature of the black body radiation source.

A further object of this invention is to provide a novel black body radiation source which employs the same control device for either heating or cooling the radiation source so that separate heating and cooling controllers are not required when the reference source is utilized at temperatures below ambient.

Still another object of this invention is to provide a novel black body radiation source which can automatically select the heating or cooling mode if it is desired to stabilize the radiation source at a temperature close to a varying ambient temperature in which the source is operating.

In carrying out this invention in an illustrative embodiment thereof, a cascaded thermoelectrically heated or cooled unit is provided having a radiation source of high emissivity mounted on the top stage of the thermoelectric unit. The unit, along with the radiation source, is encased and a controlled stream of dry gas is applied in the case to prevent moisture from surrounding air from settling on the source. The source may be heated or cooled, depending on the polarity of the applied current to the cascaded thermoelectric unit. The control of whether the unit is heating or cooling may be done manually, or automatically if it is desired to stabilize the radiation source at a temperature which is close to the varying ambient temperature in which the black body radiation source is operating.

Figure 3:
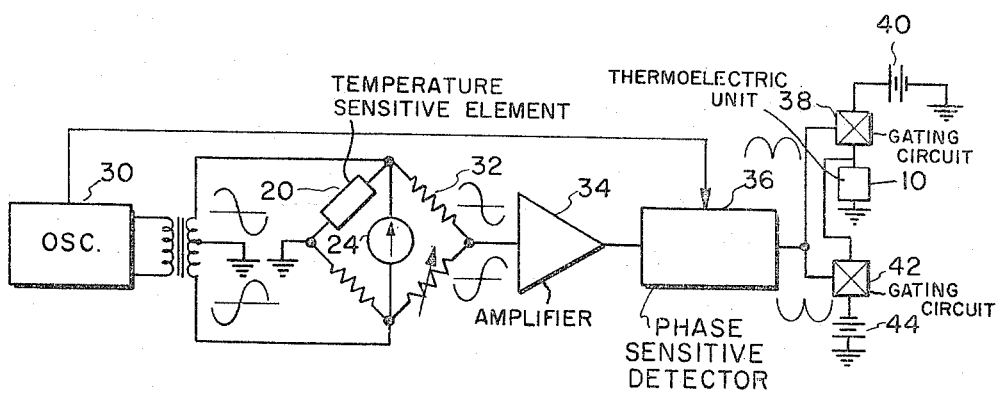
Figure 2:
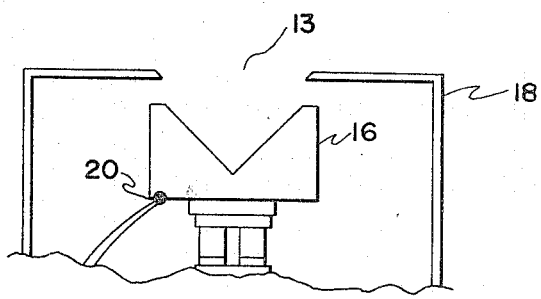

The invention, both as to its organization and method of operation, together with further objects and advantages thereof, may best be understood from the following description taken in connection with the accompanying drawings, in which:

FIG. 1 shows a thermoelectrically heated or cooled black body radiation source as embodied in this invention, FIG. 2 shows a conical shaped black body radiation source which may be utilized in FIG. 1, and FIG. 3 shows a block diagram of a circuit for automatically controlling the black body radiation source of FIG. 1.

Referring now to FIG. 1, a cascaded thermoelectric unit 10 is mounted on a heat sink 12 which has a dry gas inlet 14 therethrough. Mounted on the top stage of the cascaded thermoelectric unit 10 is a radiation source 16. The radiation source 16 may be in the form of a disc as shown in FIG. 1, or in the form of a cavity, which is shown as a conical shaped cavity in FIG. 2. The radiating surface of the radiation source 16 should have a high emissivity. The entire structure is enclosed by a case 18 having an aperture 13 therein and openings 15 and 17 for accommodating electrical conductors. Electrical conductors 29 and 27 supply power to the cascaded thermoelectric unit through a switching unit 28 from a source of electric current. The switching arrangement 28 allows the polarity on the leads 27 and 29 to be reversed. A temperature-sensitive element 20 such as a thermistor bead or thermocouple is mounted in the radiation source 16 and by electrical leads 19 and 21 is connected as a leg of a bridge circuit 22 having a meter 24 therein and a source of potential 26 applied thereacross.

Thermoelectric heating or cooling is provided by the cascaded thermoelectric unit 10, and is caused by current flowing across a junction of two dissimilar metals which produce either a heating or a cooling of the junction depending on the polarity of the current applied thereto. The thermoelectric unit consists of P and N-type semiconductor pellets, for example doped bismuth telluride, which are serially interconnected with a series of copper strips which constitute the hot and cold junctions. With all of the parameters fixed, the total amount of heating and cooling by the unit is directly proportional to the total area of the material in the thermoelectric unit. The type of unit shown in FIG. 1 has three cascaded stages, the upper stage of which is directly in contact with the radiation source 16.

The temperature of the radiation source 16 is determined by the meter 24 in the bridge circuit 22. The current applied through the meter 24 due to an unbalance in the bridge circuit 22 because of the changing temperature of the temperature-sensitive device 20 can be calibrated to indicate the temperature of the radiation source 16. The temperature of the radiation source 16 can then be changed by heating or cooling, by switching the polarity of the current applied to the thermoelectric unit 10. In order to prevent moisture from the ambient air from freezing out on the radiating surface of the radiation source 16, a slight stream of dry gas is applied through the inlet 14. With a very slight stream of nitrogen passing through the unit, a temperature of −30° C. is attainable. Even lower temperatures may be achieved with a controlled reduced flow of argon. If the use of the radiation source can withstand spectral cutoff which would be provided by a window in the aperture 13, even lower temperatures could be achieved. In the heating mode, the unit can be operated up to 100° C., and even higher temperatures can be reached using units which employ solders having higher melting points.

If the radiation source is employed in a varying ambient temperature environment, and it is desired to stabilize the radiation source at a given temperature, means can be provided for automatically selecting the heating or cooling mode for performing this function. A type of automatic controller which will perform this function is shown in FIG. 3, which includes an oscillator 30 which is transformer-coupled to a bridge circuit 32. The bridge circuit 32 includes the temperature sensitive element 20 and the calibrated meter 24. The output of the bridge is applied to an amplifier 34, and from there to a phase-sensitive detector 36 which is also coupled to the oscillator 30. The output of the phase-sensitive detector 36 is applied to gating circuits 38 and 42, which are connected in shunt with the cascaded thermoelectric unit 10.

The gates 38 and 42 may, for example, be of the silicon controlled rectifier type which are connected to be polarity-sensitive to the output of the phase detector 36. The gate 38 controls a source of potential 40 which applies a positive current to the thermoelectric unit 10 and the gate 42 controls a source of negative potential 44 which applies a negative potential to the thermoelectric unit 10 when activated.

In operation, the bridge circuit 32 in FIG. 3 may be adjusted so that the temperature which is desired to be maintained by the radiation source nulls the meter 24. Then, if the temperature-sensitive device 20 is heated or cooled, a signal will be generated having a polarity which depends on whether the temperature-sensitive device is hotter or colder. The proper polarity-sensitive gate 38 or 42, whichever the case may be, will be activated to supply proper polarity current to the thermoelectric unit for heating or cooling the radiation source 16 until the bridge circuit returns to a null condition. The process will continue as long as the radiation source temperature changes.

The black body radiation source as embodied in this invention offers the distinct advantage of a wide range of temperatures, both below and above the ambient temperatures in which the radiation source is operating. This is accomplished using a single thermoelectric unit which does both the heating and cooling. The invention further offers the advantage of being compact and portable as well as offering a means for preventing moisture in the ambient air from affecting substantially its operation as a radiation source. Furthermore, the invention offers a means of automatically selecting the heating or cooling mode in order to stabilize the radiation source at a temperature which is quite close to a varying ambient temperature environment.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. A black body radiation source which may be heated or cooled for controlling the temperature thereof and allowing said source to be operated at temperatures above and below the environmental temperature in which the source is used, comprising, in combination,
    (a) a cascaded thermoelectric unit having a direct current potential applied thereto with the polarity of said potential determining whether the unit produces a heating or a cooling effect,
    (b) a black body radiation source of high emissivity mounted on the top stage of said cascaded thermoelectric unit which is adapted to be heated or cooled thereby,
    (c) means encasing said unit and said source,
    (d) means for sending a controlled stream of dry gas through said last named means and over said source to prevent moisture from the surrounding air from settling on said source,
    (e) means including a temperature sensitive element mounted in said source for determining the temperature of said source, and
    (f) means for changing the polarity of the direct current potential applied to said thermoelectric unit whereby said source may be operated at desired temperatures either above or below the ambient temperature in which the source is operating.

2. The structure set forth in claim 1 wherein said radiation source is a disc.

3. The structure set forth in claim 1 wherein said radiation source is a body having a cavity therein.

4. A black body reference source which may be heated or cooled for controlling the temperature thereof and allowing said source to be operated at temperatures above and below the environmental temperature in which the source is used, comprising, in combination,
    (a) a cascaded thermoelectric unit having a direct current potential applied thereto with the polarity of said potential determining whether the unit produces a heating or a cooling effect,
    (b) a black body radiation source of high emissivity mounted on the top stage of said cascaded thermoelectric unit which is adapted to be heated or cooled thereby,
    (c) means encasing said unit and said source,
    (d) means for sending a controlled stream of dry gas through said last named means and over said source to prevent moisture from the surrounding air from settling on said source,
    (e) means including a temperature sensitive element mounted in said source for determining the temperature of said source, and
    (f) means responsive to said last named means for automatically controlling the temperature of said source at a predetermined temperature which may be either above or below the ambient temperature in which the source is used by changing the polarity of said direct current potential to said thermoelectric unit.

References Cited by the Examiner

UNITED STATES PATENTS

| | | | |
|---|---|---|---|
| 2,844,638 | 7/1958 | Lindenblad | 136—203 |
| 2,952,762 | 9/1960 | Williams et al. | 250—85 |
| 3,077,539 | 2/1963 | Blau et al. | 250—85 |
| 3,125,860 | 3/1964 | Reich | 136—203 X |
| 3,138,934 | 6/1964 | Roane | 62—3 |
| 3,207,159 | 9/1965 | Tateisi | 62—3 X |

LOUIS R. PRINCE, *Primary Examiner.*

S. H. BAZERMAN, *Assistant Examiner.*